United States Patent
Ducolon

(10) Patent No.: US 9,849,942 B2
(45) Date of Patent: Dec. 26, 2017

(54) FOLDABLE BOAT RAMP

(71) Applicant: Fredric Dan Ducolon, Grapeview, WA (US)

(72) Inventor: Fredric Dan Ducolon, Grapeview, WA (US)

(73) Assignee: Rainier Air Inc., Grapeview, WA (US)

( * ) Notice: Subject to any disclaimer, the term of this patent is extended or adjusted under 35 U.S.C. 154(b) by 0 days.

(21) Appl. No.: 14/707,842

(22) Filed: May 8, 2015

(65) Prior Publication Data

US 2017/0327191 A1 Nov. 16, 2017

(51) Int. Cl.
*B63B 17/00* (2006.01)
*B63B 27/14* (2006.01)
*B63C 3/02* (2006.01)

(52) U.S. Cl.
CPC .............. *B63B 27/143* (2013.01); *B63C 3/02* (2013.01); *B63B 2027/141* (2013.01)

(58) Field of Classification Search
CPC .................................. B63B 27/143; B63C 3/02
See application file for complete search history.

(56) References Cited

U.S. PATENT DOCUMENTS

| | | | |
|---|---|---|---|
| 7,028,632 B2 | 4/2006 | Blank | |
| 2004/0232021 A1* | 11/2004 | Linton | B65D 85/68 206/335 |
| 2004/0244129 A1* | 12/2004 | Emerson, Jr. | B65G 69/30 14/69.5 |
| 2007/0163484 A1 | 7/2007 | Eng et al. | |
| 2008/0016872 A1* | 1/2008 | Toffan | F02K 1/008 60/770 |
| 2010/0175608 A1 | 7/2010 | Heckaman et al. | |
| 2014/0158038 A1* | 6/2014 | Johnston | B63B 27/143 114/355 |

\* cited by examiner

*Primary Examiner* — Stephen P Avila

(74) *Attorney, Agent, or Firm* — Clark A. Puntigam; Jensen & Puntigam, P.S.

(57) ABSTRACT

A boat ramp designed to collapse so the amphibious vehicle may be towed at highway speeds. The ramp fabricated of a central isosceles triangle hinged to the vehicle at its base flanks a pair of right triangles hinged along their hypotenuses such that the ramp can be folded over the vehicle during travel. The hinged portion is reinforced with removable steel channel during use.

8 Claims, 3 Drawing Sheets

FOLDABLE BOAT RAMP

TECHNICAL FIELD

This invention relates to towable amphibious landing craft, and more particularly to the loading bow of such craft which allows the easy loading and unloading of the craft and yet enables traverse of the highway without restriction. The bow loading ramp consists of three triangles hingedly interconnected such that they form a flat loading platform, but collapse within the craft profile when stowed.

BACKGROUND OF THE INVENTION

There are often times when a work boat is needed, and yet it is most economical to move the vessel by land to the desired site. With this in mind, a work boat has been designed to meet highway specifications, allowing it to be towed at high speeds without restriction, and yet incorporates the necessary tools for performing the necessary work, such as a crane, stowable side pontoons and a unique stowable bow loading ramp.

Prior art known to the inventor includes:

U.S. Pat. No. 7,028,632 granted to Blank on Apr. 18, 2006 which discloses a stowable ramp for a pontoon boat. The ramp is stowed on rails beneath the deck and can be removed and attached at a variety of positions along the edge of the boat.

U.S. Publication 2007/0163484 published Jul. 19, 2007 discloses a boat ramp on the bow of a vessel, including a first part hinged to the bow at a first end and a second part hinged to the first part at a second end. Means for raising and lowering the ramp are also disclosed.

U.S. Publication 2010/0175608 published Jul. 15, 2010 disclosed a boat ramp, including a first section pivotably coupled to the boat for rotation about a vertical axis and a second section pivotably connected to the first section, such that it may be extended outwardly from the first section or stowed on top of the first section.

SUMMARY OF THE INVENTION

With the above-noted prior art in mind, the present invention provides an inexpensive, secure and lawful mechanism for loading and unloading a highway-trailerable, amphibious landing craft.

The foldable bow ramp includes a main section in the form of an isosceles triangle of steel channel covered with diamond plate. The base of the triangle is hingedly connected to the bow of the craft, permitting rotation about a horizontal axis. Hingedly secured to each side of the main section is a right triangle with the hypotenuse adjacent the triangle side, such that when deployed, it forms a substantially planar surface but can be folded upwardly to a stowed position.

BEST MODE FOR CARRYING OUT THE INVENTION

Figure 1:
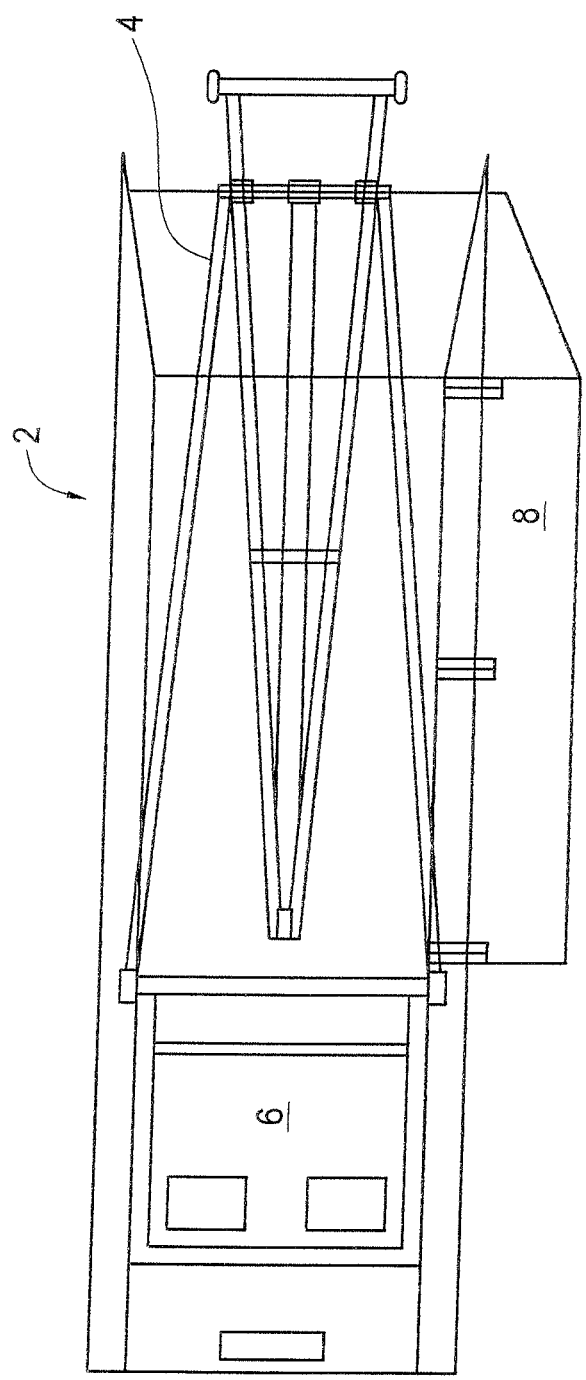
FIG. 1 is a schematic plan view of the amphibious landing craft.

As seen in FIG. 1, the amphibious, towable landing craft 2 is approximately 35 feet in length and 10 feet in width. The vessel will include a winch with a boom 4, collapsible for towing, a pilot house 6 and a pair of stabilizing side pontoons 8 (only one showing). The pontoons are foldable on top of the deck for towing, keeping the width within the proscribed highway dimensions.

Figure 2:
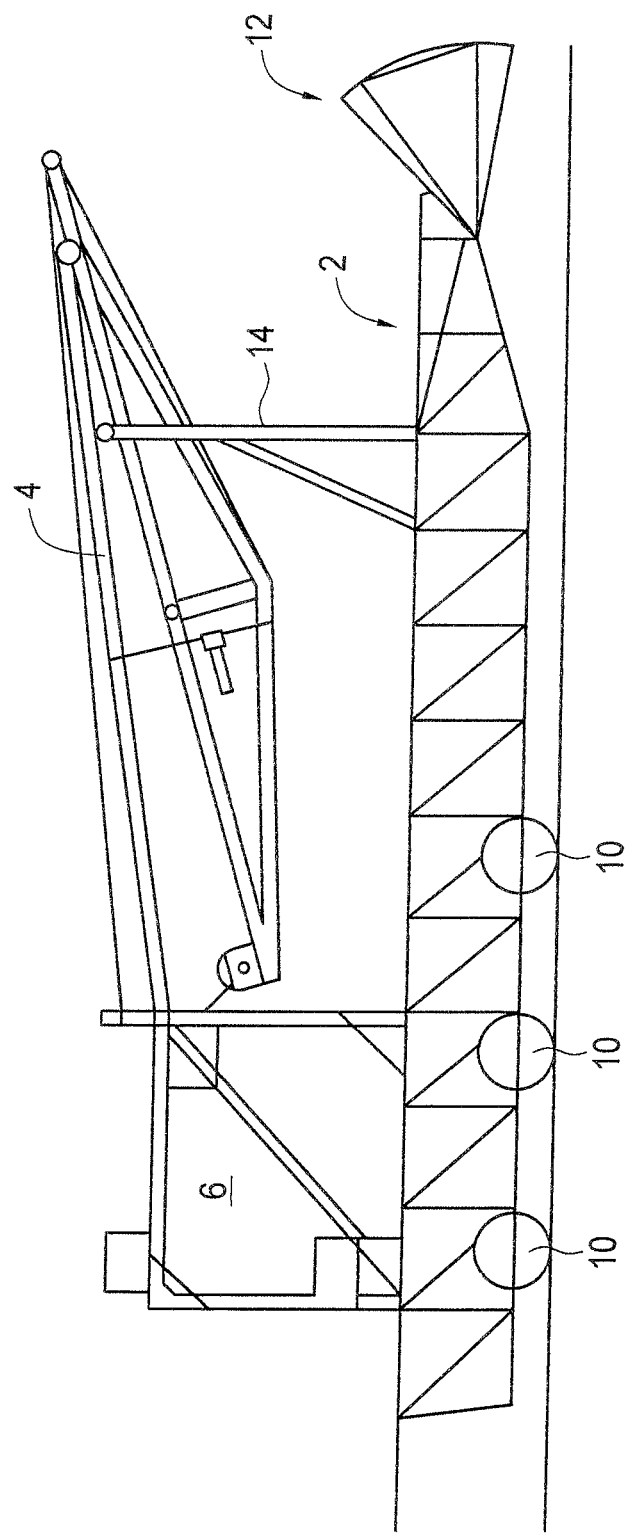
FIG. 2 is a schematic side elevation of the amphibious, towable landing craft showing the loading ramp in the stowed position.

Reference is now had to FIG. 2, wherein the amphibious craft is shown in the trailerable mode, with the ramp 12 (described in greater detail hereinafter) in the stowed position. The boom 4 is likewise in the stowed position, resting on support 14 and the hook secured. Wheels 10, which may be retracted when in the water, are shown in their lowered trailerable position.

Figure 3:
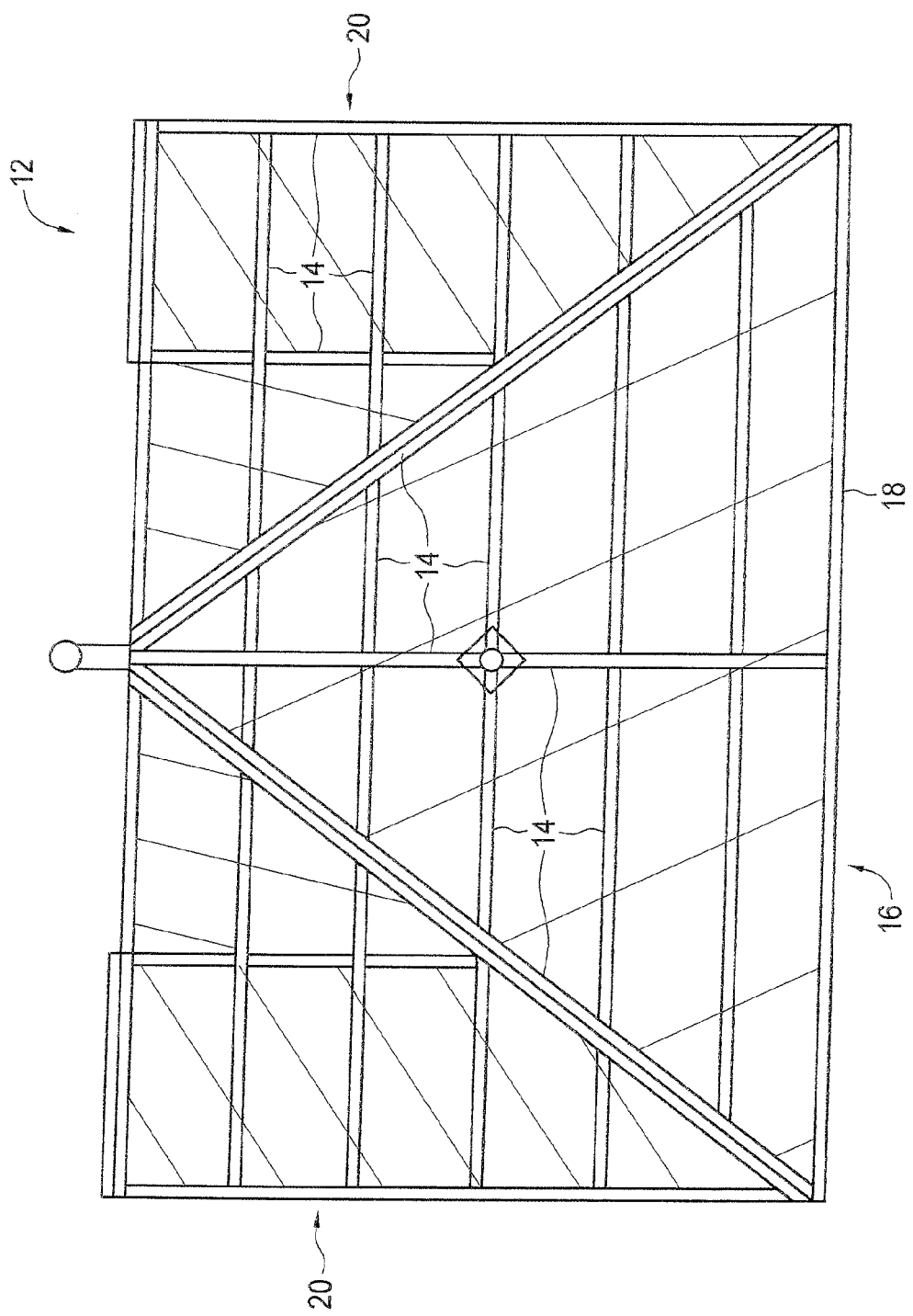
FIG. 3 is a planar view of the landing ramp in the deployed position.

As seen in FIG. 3, the loading ramp 12 is shown in its deployed substantially planar position. As such, it would extend from the bow of the vessel to the supporting surface.

Although the ramp is constructed in three main sections, it is to be understood that the ramp is reinforced with appropriate steel channel (3"×1½"×¼") 14 and covered with 3/16" diamond plate steel with the exception of a small portion, generally not load-bearing, with ⅛" expanded metal to permit viewing.

The ramp comprises a central section in the shape of an isosceles triangle 16 with a hinge 18 secured to its base, extending the full width of the bow, permitting vertical movement of the ramp about the hinge. A pair of right triangles 20 flank the central section 16 and have each of their hypotenuses hingedly secured along the entire length of the sides of isosceles triangle 16, permitting them to be folded upward to the stowed travel position, as shown in FIG. 2. A trailer hitch extends under and is secured to the ramp, adding additional reinforcement. The hinges between the triangular section are reinforced with removable steel channel during use.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A vessel for use on land and water, comprising:
   an amphibious landing craft transportable on highways, the landing craft including wheels and a connecting member for towing;
   a loading ramp for the landing craft, the loading ramp including a first triangular section having a base and two sides, the triangular section being movably connected along its base to a bow of the landing craft, permitting said section to be lowered for loading or unloading the landing craft and a pair of triangular side sections, each side section having an edge which is movably connected to, respectively, the sides of the triangular section, permitting each side section to be moved upwardly to a stored position, the loading ramp comprising the first triangular section and the pair of triangular side sections terminating in a forward edge.

2. The vessel as in claim 1, wherein the loading ramp is supported by appropriate bracing.

3. The vessel as in claim 2, wherein the loading ramp is substantially covered with diamond plate steel.

4. The vessel of claim 1, including pontoons positioned along the sides of the landing craft, each pontoon being moveable upwardly to a stowed position.

5. The vessel of claim 1, including a pilot house portion at a rear end of the landing craft.

6. The vessel of claim 1, including removable reinforcing elements supporting the triangular side sections.

7. The vessel of claim 1, including a boom member for moving items onto and off the landing craft.

8. The vessel of claim 1, wherein the wheels are retractable.

\* \* \* \* \*